United States Patent
Upmanue et al.

(10) Patent No.: US 10,987,996 B2
(45) Date of Patent: Apr. 27, 2021

(54) BABY COMFORT MONITORING SYSTEM AND METHOD

(71) Applicants: DENSO International America, Inc., Southfield, MI (US); Denso Corporation, Kariya (JP)

(72) Inventors: Vikas Upmanue, Novi, MI (US); Te-Ping Kang, Ann Arbor, MI (US); Yu Zhang, Farmington Hills, MI (US); Jordan Necovski, Livonia, MI (US); Bilal Alasry, Dearborn, MI (US); Sean Bleicher, Fenton, MI (US); Doua Vang, Waterford, MI (US); Eleanor Duke, Sterling Heights, MI (US); Nicholaus Spunar, Canton, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 58 days.

(21) Appl. No.: 16/296,438

(22) Filed: Mar. 8, 2019

(65) Prior Publication Data
US 2020/0282803 A1 Sep. 10, 2020

(51) Int. Cl.
*B60H 1/00* (2006.01)
*G01K 13/00* (2021.01)

(52) U.S. Cl.
CPC ....... *B60H 1/00742* (2013.01); *B60H 1/0075* (2013.01); *B60H 1/00657* (2013.01);
(Continued)

(58) Field of Classification Search
CPC ............ B60H 1/00878; B60H 1/00985; B60H 1/0075; B60H 1/00657; B60H 1/00735; B60H 1/00742
See application file for complete search history.

(56) References Cited

U.S. PATENT DOCUMENTS

| 6,079,781 A | 6/2000 | Tilley |
| 6,809,643 B1 | 10/2004 | Elrod et al. |

(Continued)

FOREIGN PATENT DOCUMENTS

| CN | 108332368 A | * | 7/2018 |
| JP | 2005104405 A | | 4/2005 |

(Continued)

OTHER PUBLICATIONS

English translation of CN-108332368-A (Year: 2018).*

*Primary Examiner* — Nelson J Nieves
*Assistant Examiner* — Schyler S Sanks
(74) *Attorney, Agent, or Firm* — Brooks Kushman P.C.

(57) ABSTRACT

A system and method are disclosed for a vehicle that comprises one or more sensors configured to obtain information indicating a physical state of a baby. A wireless transceiver may be included and in communication with a mobile device. The transceiver may be configured to connect mobile device with a camera configured to monitor the baby. A controller may also be in communication with the one or more sensors and the wireless transceiver. The controller may be configured to determine the physical state of the baby utilizing the information obtained from the one or more sensors. The controller may also be configured activate one or more vehicle systems in response to the physical state of the baby and to output on a vehicle display or the mobile device a notification to a user indicating the physical state of the baby.

19 Claims, 3 Drawing Sheets

(52) U.S. Cl.
CPC ..... *B60H 1/00792* (2013.01); *B60H 1/00878* (2013.01); *B60H 1/00985* (2013.01); *G01K 13/002* (2013.01)

(56) References Cited

U.S. PATENT DOCUMENTS

| | | | |
|---|---|---|---|
| 7,320,223 | B1 | 1/2008 | Dabney et al. |
| 9,937,830 | B1 | 4/2018 | Curry, V |
| 2005/0088296 | A1* | 4/2005 | Lee ................ G08B 21/02 340/539.12 |
| 2015/0105976 | A1* | 4/2015 | Shikii ............ B60H 1/00742 701/36 |
| 2018/0099592 | A1* | 4/2018 | Curry, V ............ B60N 2/5621 |
| 2018/0281627 | A1 | 10/2018 | Ali |
| 2018/0321700 | A1* | 11/2018 | Kwak ................ A61B 5/01 |

FOREIGN PATENT DOCUMENTS

| | | |
|---|---|---|
| JP | 2006112680 A | 11/2006 |
| JP | 2006324742 A | 11/2006 |
| JP | 2011230529 A | 11/2011 |
| JP | 2015096413 A | 5/2015 |
| JP | 2019140571 A | 8/2019 |

* cited by examiner

BABY COMFORT MONITORING SYSTEM AND METHOD

TECHNICAL FIELD

The present disclosure relates to a system and method for monitoring the physical state of a baby and adjusting the vehicle environment in response to the baby's current physical state.

BACKGROUND

Under current pediatric recommendations and government regulations, it is recommended that babies and infants be secured within a baby seat while a vehicle is traveling. For newborn or very young babies, the baby seat may be positioned rear-facing making it difficult for the driver or other passengers to observe the babies' current physical state. For older babies or infants that are front-facing, a driver or passenger may not be able to monitor the babies' physical state. It may therefore be desirable to actively monitor a babies' physical state, regardless of positioning, to make the time spent within the vehicle more enjoyable for both the baby and the driver or other passengers.

SUMMARY

According to one embodiment, a system and method are disclosed for a vehicle that comprises one or more sensors configured to obtain information indicating a physical state of a baby. A wireless transceiver may be included and in communication with a mobile device. The transceiver may be configured to connect mobile device with a camera configured to monitor the baby. A controller may also be in communication with the one or more sensors and the wireless transceiver. The controller may be configured to determine the physical state of the baby utilizing the information obtained from the one or more sensors. The controller may also be configured activate one or more vehicle systems in response to the physical state of the baby and to output on a vehicle display or the mobile device a notification to a user indicating the physical state of the baby.

The one or more sensors may also be configured to obtain thermal readings from the baby and an interior cabin of the vehicle. The controller may be further configured to determine whether a baby is distressed based on a deviation between a temperature of the baby and a temperature of the interior cabin of the vehicle. The system or method may allow the user to adjust the one or more vehicle systems when it is determined that the baby is distressed.

The one or more sensors may further be configured to obtain thermal readings of a vehicle interior cabin. The controller may be further configured to determine whether a temperature of the vehicle interior cabin is outside one or more predefined temperature settings. An HVAC system may be adjusted when the temperature of the vehicle interior cabin is outside the one or more predefined temperature settings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
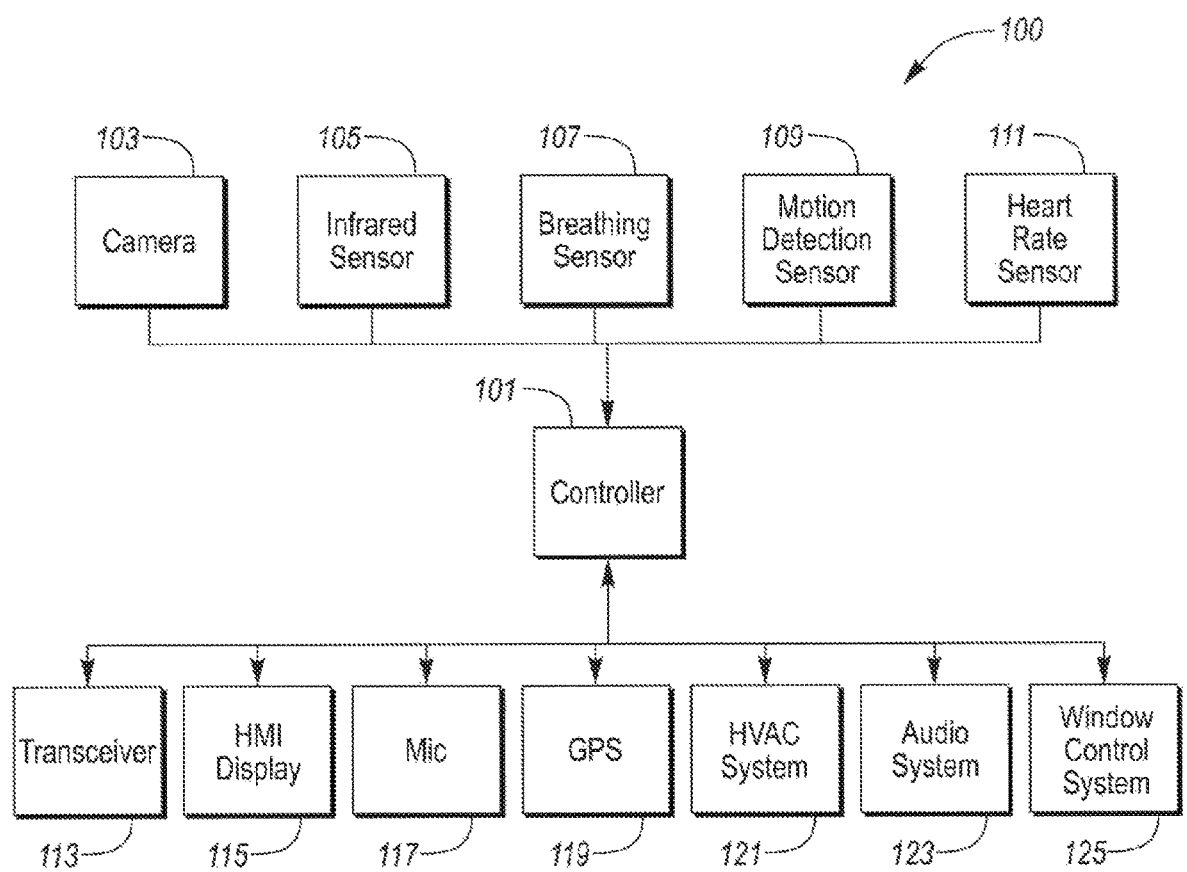
FIG. 1 illustrates an exemplary block diagram of a baby comfort monitoring system.

FIG. 1 illustrates an exemplary block diagram of a baby comfort monitoring system 100. The system 100 may include a controller 101. The controller 101 may be embodied in a processor configured to carry out instructions for the methods and systems described herein. The controller 101 may include a memory (not individually shown in FIG. 1), as well as other components specific processing within the vehicle. As explained below, it is contemplated that there may be systems 100 located throughout the vehicle to monitor the physical state of a baby.

The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof.

The memory may be in any form of one or more data storage devices, such as volatile memory, non-volatile memory, electronic memory, magnetic memory, optical memory, or any other form of data storage device. The memory may be an internal to system 100 (e.g., DDR memory) or memory may comprise removable memory components (e.g., micro-SD card memory).

The controller 101 may be in communication with various sensors, modules, and vehicle systems within and remote of a vehicle. For instance, system 100 may include camera 103, infrared sensor 105, breathing sensor 107, motion sensing sensor 109, heart rate sensor 111, transceiver 113, and sound identification device 117 (e.g., microphone). System 100 may also be connected and in communication with additional modules or systems located within the vehicle, including an HMI 115, GPS system 119, HVAC system 121, audio system 123, or window control system 125.

FIG. 1 is exemplary, and system 100 may include more or less sensors of varying types and may also be connected to numerous different systems and modules located within and external to the vehicle. System 100 may be connected to a vehicle's CAN bus network (or similar wired or wireless vehicle communication network) so that information, data, or commands may be transmitted and received from the other systems and modules located throughout the vehicle.

One or more HMIs 115 may be included throughout a vehicle cabin. HMI 115 may include any type of display known to be used within a vehicle. HMI 115 may include a dashboard display, navigation display, multimedia display, heads-up display, thin-film transistor liquid-crystal display (TFT LCD), etc. The HMI 115 may also be connected to speakers to output sound related to commands or the user interface of the vehicle. The HMI 115 may be utilized to output various commands or information to occupants (e.g. driver or passengers) within the vehicle. For example, the HMI 115 may display messages to the driver about the physical state of the baby in the rear-seat.

The HMI 115 may utilize any type of monitor or display utilized to display relevant information to the vehicle occupants. The HMI 115 may also include a heads-up display ("HUD") that is utilized to display an interface and other objects on a windshield so that the images are within a driver's periphery while driving or in an occupant's line of sight.

In addition to providing visual indications, the HMI 115 may also be configured to receive user input via a touch-screen, user interface buttons, etc. The HMI 115 may be configured to receive user commands indicative of various vehicle controls such as audio-visual controls, certain vehicle features, cabin temperature control, etc. The system 100 may receive such user input and in turn command a relevant vehicle system of component to perform in accordance with the user input. For instance, a user (e.g., a driver) may use HMI 115 to set temperature comfort settings. System 100 may use the temperature comfort settings to automatically adjust the temperature in the rear compartment of the vehicle in response to a baby's monitored physical state. The user may also further modify (or override) the temperature adjustments of the system 100 using additional controls provided by HMI 115.

The HMI 115 may be embedded into one or more vehicle headrests or positioned in the rear cabin to be viewable by a rear-seat occupant, i.e., baby or infant. HMI 115 may be positioned to face the baby located within the vehicle. HMI 115 embedded within a headrest may allow an occupant located in the vehicle's front seats (e.g., driver or passenger) to interact with the baby located in the vehicle's rear seats. For instance, HMI 115 may display the face of a user to calm a baby who may be experiencing discomfort while traveling in the vehicle. Or system 100 may be programmed to use the HMI 115 to automatically play shows or videos to baby during certain scenarios. System 100 may be programmed to learn when a baby appears to be distressed, agitated, or drowsy. Upon learning a babies' comfort states, system 100 may automatically activate HMI 115 to play soothing videos to calm a troubled baby or to sooth a baby to sleep. Likewise, system 100 may be programmed to learn when a baby appears to be drowsy, but a programmed setting indicates the current time is not within the babies' nap schedule. System 100 may again use the learned baby comfort state and preprogrammed comfort settings to automatically activate HMI 115 to play engaging or active videos to help prevent the baby from falling asleep.

System 100 may also include a transceiver 113 that may operable to be connected and communicate with one or more mobile devices (e.g., cell phone, smart phone, PDA, tablet, or any other device having wireless remote network connectivity). It is contemplated that transceiver 113 may include a BLUETOOTH transceiver, a WiFi transceiver, or a cellular transceiver that is operable to communicate with the mobile device. Once connected, system 100 may automatically transmit to the mobile device information about the physical state of the baby located within the vehicle. For instance, system 100 may transmit to a parent located at home may receive an alert on a smart phone that the babies' temperature has exceeded a predefined temperature setting. The mobile phone could then be used to communicate with system 100 to adjust the vehicle's HVAC system 121 to lower the temperature. System 100 may use the information received from mobile device to automatically adjust the temperature setting (or any other setting) within the vehicle cabin. It is contemplated the user could use the mobile device to (1) remotely activate other vehicle systems or modules; (2) adjust other predefined comfort settings that are used by system 100 to automatically adjust vehicle systems or modules; or (3) interact with the baby using HMI 115.

Figure 2:
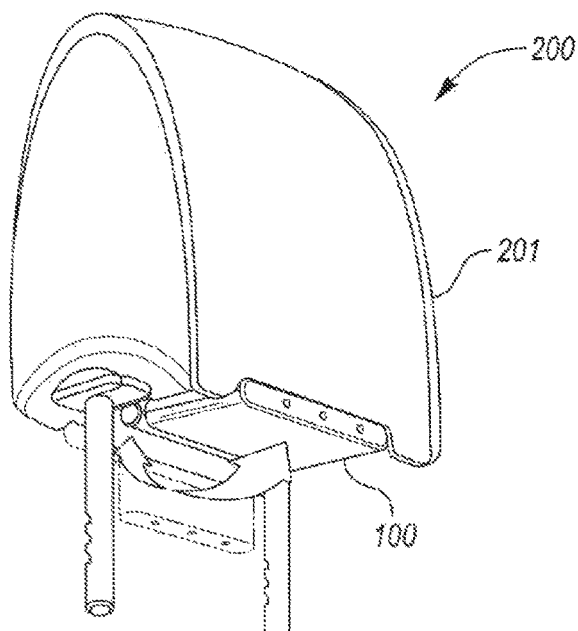
FIG. 2 illustrates the exemplary baby comfort monitoring system embedded within a vehicle headrest.

With reference to FIG. 2, a headrest assembly 200 is shown. It is contemplated that system 100 may be included within a headrest portion 201 of a vehicle seat. Headrest assembly 200 may be used within a front-row seat or a back-row seat of a vehicle. Headrest assembly 200 may be designed so that system 100 may be adjustable (as shown by arrow) to accommodate how a baby is positioned, or seated, within the vehicle. For instance, a younger baby may be seated in a rear-facing baby seat. The system 100 included within a back-row seat headrest can be adjusted to accommodate and monitor a rear-facing baby. Alternatively, older babies may be positioned in a forward-facing car seat. System 100 located within a front-row seat headrest can be adjusted to accommodate and monitor a forward-facing baby. While system 100 is depicted within headrest assembly 200, it is also contemplated that system 100 may be located anywhere within the vehicle cabin to accommodate and monitor the physical state of the baby.

Figure 3:
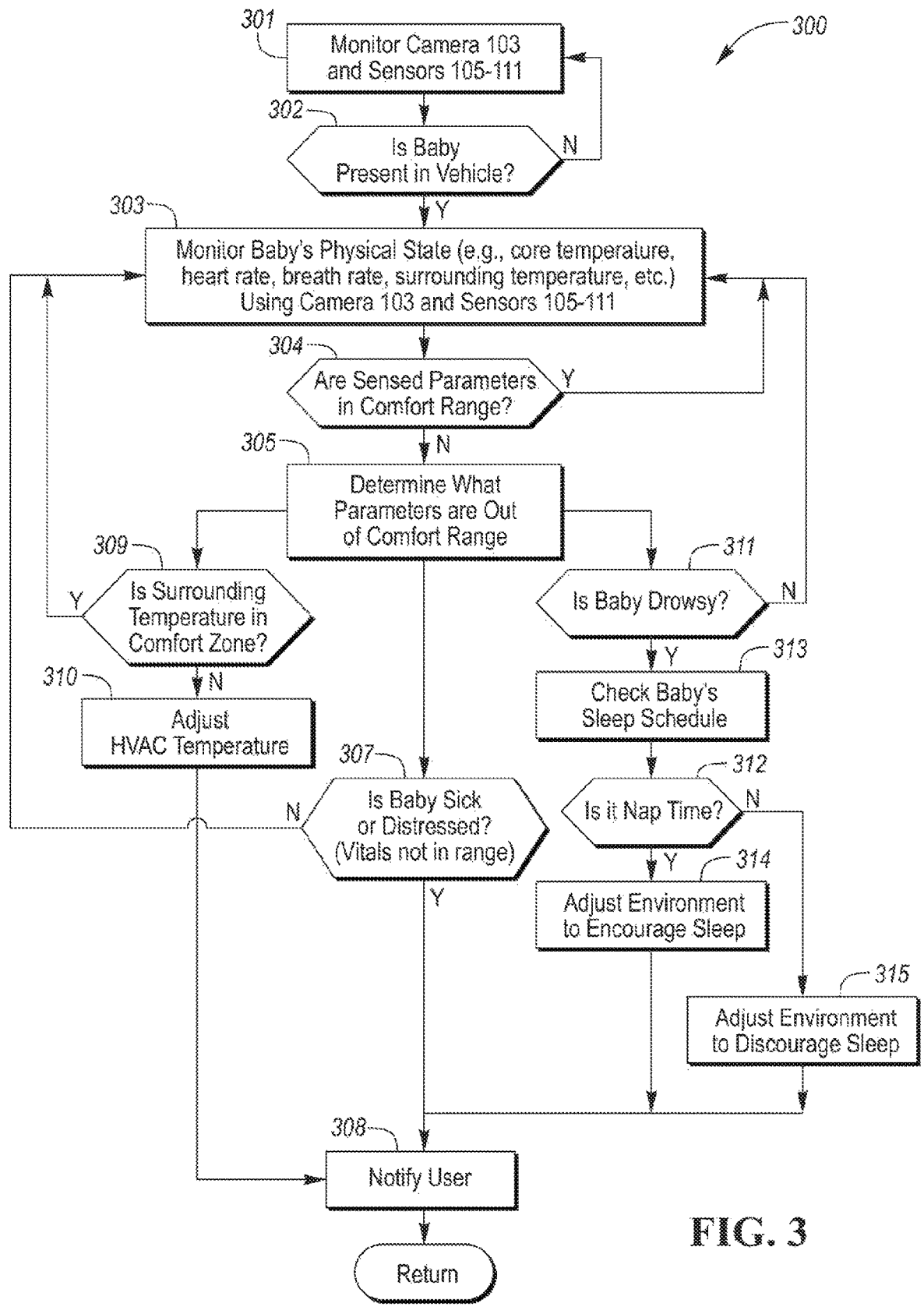
FIG. 3 is an exemplary flow diagram illustrating operation of the baby comfort monitoring system.

With reference to FIG. 3, flow diagram 300 illustrates how the baby comfort monitoring system 100 may operably monitor and activate one or more modules or vehicle systems in response to a babies' physical state. At step 301, system 100 may receive data from camera 103 or sensors 105-111 to monitor if a baby is present within the vehicle. At step 302, controller 101 will use the data received to determine whether there is a baby present within the vehicle. If controller 101 determines a baby is not present in the vehicle, flow diagram 300 returns to step 301.

If controller 101 determines a baby is present, flow diagram 300 proceeds to step 303. At step 303, controller 101 may continue to receive data from camera 103 and sensors 105-111 to monitor a babies' core temperature, heart rate, breathing rate, activity of the baby, eye movements of the baby, temperature of the area surrounding the baby, etc. Again, it is contemplated that system 100 may monitor additional physical aspects of the baby or other parameters of the vehicle cabin.

It is contemplated that system 100 may operate to learn a babies' physical state. For instance, system 100 may include a deep neural network or convolutional neural network that is programmed to go through a learning stage. System 100 may then be able to recognize certain physical states. For instance, system 100 may be able to detect when the babies' temperature, breathing, and heart rate indicate that the baby is sick with a fever. Or system 100 may be able to detect when the babies' eye motions, breathing, and heart rate indicate that the baby is drowsy and ready to fall asleep. As explained below, system 100 may automatically activate one or more modules or vehicle systems in response to the monitored baby physical state. System 100 may use preprogrammed comfort settings to automatically activate one or more modules or vehicle systems. System 100 may also automatically notify a user of the monitored baby physical state using HMI 115 or using transceiver 113 that is connected to a mobile device.

At step 304, controller 101 will use data received from camera 103 and sensors 105-111 to determine whether the babies' physical state is within a predefined comfort range (i.e., settings or thresholds). It is contemplated that the predefined comfort range may be established in advance by the user. For instance, the HMI 115 may be used to display one or more comfort range settings that can be adjusted by the user. Or a user connected to transceiver 113 may use a mobile device to adjust the comfort range settings. As explained below, system 100 may automatically adjust one or more modules or vehicle systems based on a monitored temperature range for the baby, the babies' sleep or nap schedule, or lower and upper heart rate settings. If controller 101 determines that one or more comfort range settings are not satisfied or exceeded, flow diagram 300 returns to step 303.

If controller 101 determines that one or more comfort range settings are satisfied or exceeded, flow diagram 300 may proceed to step 305 where the system 100 processes the data and determines what actions need to be taken based on the babies' current physical state. For instance, controller 101 may advance to step 307 where the data received from camera 103 and sensors 105-111 may be used to determine if the baby vitals are indicating that the baby is illustrating signs of being sick or distressed.

Figure 4:
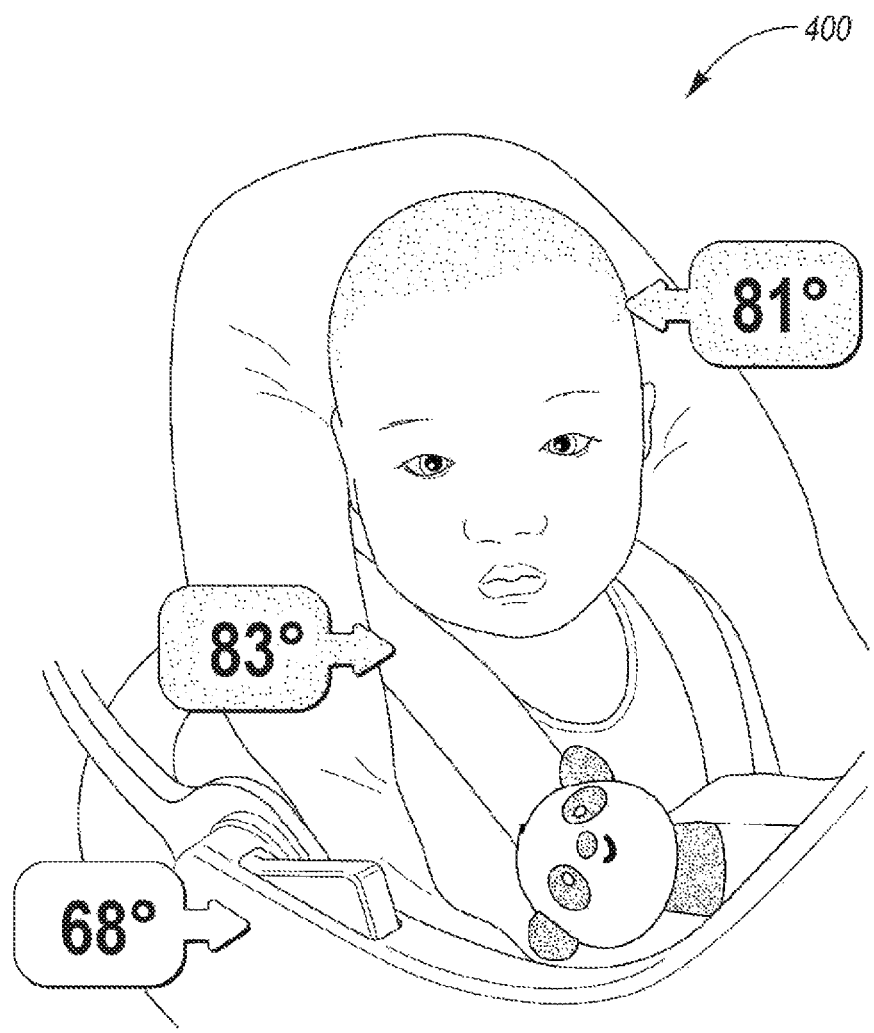
FIG. 4 illustrates a baby being monitored by the baby comfort monitoring system.

FIG. 4 illustrates one exemplary method for how system 100 may determine that the baby may be sick. Again, system 100 may go through a learning process to detect a babies' physical state and to learn when a baby is sick or distressed. In the example shown by FIG. 4, system 100 may determine the baby is sick using infrared sensor 105 and/or camera 103 that are monitoring the temperature of the baby, physical characteristics of babies' face (e.g., eye movement), and the area surrounding the baby. As shown, system 100 may automatically determine that based on the babies' temperature being significantly elevated in comparison to the vehicle surroundings, that the baby may be demonstrating the symptoms of a fever. FIG. 4 illustrates that system 100 may determine the temperature of the babies' forehead and area next to the baby is above 80 degrees Fahrenheit, while a section of the baby car seat is under 70 degrees Fahrenheit. Based on the deviation between these temperatures, system 100 may determine the child is sick or distressed.

System 100 may use other data including data received from the breathing sensor 107, heart rate sensor 111, and sound identification device 117 to further determine whether the baby is sick or distressed. Data received from the heart rate sensor 111 may indicate the babies' heart rate is outside predefined comfort settings. Or, data received from breathing sensor 107 may indicate the babies' breathing is in a distressed state or outside predefined comfort range settings. System 100 may be programmed to also use data received by sound identification device 117 to detect when an infant is crying. System 100 may be programmed to use sound identification device 117 to differentiate between whether the sound corresponds to a baby crying, a baby babbling, a cough, or other background sounds. Based on the level or length of the baby crying or severity of a babies' cough, system 100 may determine whether the baby is sick or distressed.

If controller 101 determines that the baby is sick or distressed, flow diagram 300 proceeds to step 308 where system 100 will automatically notify a user (e.g., occupant of vehicle or parent). System 100 may use HMI 115 to notify the user that the baby is sick or distressed. Or system 100 may use transceiver 113 to communicate to a user of a mobile device that the baby is sick or distressed. Based on the warning, the user may activate vehicle systems to comfort the sick or distressed baby. Or, the user may take additional actions, like stopping the car, to comfort the sick or distressed baby. System 100 may also be programmed to automatically engage modules or vehicle systems when it is determined that the baby is sick or distressed. System 100 may also be programmed to use transceiver 113 to contact emergency services or police if it is determined the baby is distressed and the vehicle systems indicate a vehicle crash has occurred. If system 100 determines that the baby is not sick or distressed, flow diagram 300 returns to step 303.

With reference to step 309, controller 101 may use sensed data to determine whether the cabin temperature has exceeded or fallen below a predefined comfort zone setting. For instance, the predefined comfort zone setting may be set to a lower threshold of 65 degrees Fahrenheit and upper threshold of 70 degrees Fahrenheit. If the cabin temperature is not below or above the predefined comfort zone settings, flow diagram 300 returns to step 303.

If the cabin temperature is below or above the predefined comfort zone settings, flow diagram 300 proceeds to step 310. If the cabin temperature is below a predefined comfort zone setting, system 100 will activate HVAC system 121 to heat the vehicle cabin. If the cabin temperature is above a predefined comfort zone setting, system 100 will activate HVAC system 121 to cool the vehicle cabin. System 100 will continue to monitor the cabin temperature and will automatically deactivate the HVAC system 121 when it is determined the cabin temperature is within the predefined comfort zone setting.

Once the HVAC system 121 has been activated, flow diagram 300 proceeds to step 308 to notify the user that the cabin temperature was outside a predefined comfort zone setting. Upon notification, the user may perform further actions above modification of HVAC system 121. For instance, if the vehicle cabin is above the predefined comfort zone setting, the user may use mobile phone to activate window control system 125 to tint the windows or lower a window shade. Such actions may block sunlight from the vehicle cabin to further lower the temperature.

With reference to step 311, controller 101 may use sensed data to determine whether the baby appears to be drowsy or sleepy. For instance, system 100 may use camera 103 to monitor whether the babies' eyes are closing or whether the baby is yawning. System 100 may also use heart rate sensor 111 and breathing sensor 107 to detect whether the babies' heart rate and breathing pattern is slowing. System 100 may use the sensed heart rate and breathing rate to further determine whether the baby appears to be drowsy or sleepy. If controller 101 determines that the baby is not drowsy or sleepy, flow diagram 300 returns to step 303.

If controller 101 determines that the baby appears to be drowsy or sleepy, flow diagram 300 proceeds to step 312 where controller 101 will determine whether there exists predefined nap or sleeping schedules. Again, system 100 may be designed so that HMI 115 or mobile device can be used to predefine a babies' nap or sleeping schedule. At step 313, system 100 determines whether the current time is within a babies' predefined nap/sleeping schedule. If the current time is within a babies' predefined nap schedule, flow diagram 300 proceeds to step 314 where system 100 automatically adjusts the vehicle environment to assist the baby in falling asleep. For instance, system 100 may adjust the window control system 125 to tint the vehicle windows or lower a window shade to darken the vehicle cabin to assist the baby into falling asleep. The system 100 may also activate the audio system 123 to play soothing music to assist the baby into falling asleep. The system 100 may also activate the HVAC system 121 to increase/decrease airflow or adjust the cabin temperature to assist the baby into falling asleep. Flow diagram 300 then proceeds to step 308 to notify the user that the baby is drowsy and ready for sleep. Based on the notification, the user may make further adjustments, adjust the actions already taken by system 100, or adjust the driving pattern of the vehicle to further assist the baby into falling asleep.

If the current time is not within a babies' predefined nap schedule, flow diagram 300 proceeds to step 315 where system 100 adjusts the vehicle environment to entertain or discourage the baby from falling asleep. For instance, the system 100 may activate the window control system 125 to lighten the windows or raise a window shade to brighten the vehicle cabin. The system 100 may also activate the audio system 123 to play more lively or engaging music to deter the baby into falling asleep. The system 100 may also activate the HVAC system 121 to increase/decrease airflow or adjust the cabin temperature to also deter the baby from falling asleep. The system 100 may also activate the HMI 115 to play a movie or video to entertain or deter the baby from falling asleep. Or, the system 100 may activate the HMI 115 or connect to a mobile device using transceiver 113 to display a user who can engage and talk with and deter the baby from falling asleep. Flow diagram 300 then proceeds to step 308 to notify the user who may make further adjustments, or modify the adjustments already taken by system 100, to further deter the baby into falling asleep.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A baby comfort monitoring system in a vehicle, comprising:
    one or more sensors operable to obtain information indicating a physical state of a baby, the information obtained including a temperature of the baby, a facial characteristic of the baby, and a heart rate of the baby;
    a controller in communication with the one or more sensors, wherein the controller is operable to:
    determine the physical state of the baby utilizing the information obtained from the one or more sensors;
    activate one or more vehicle systems in response to the physical state of the baby;
    activate a display allowing a user to interact and deter the baby from falling asleep; and
    output on the display a notification to the user indicative of the physical state of the baby.

2. The baby comfort monitoring system of claim 1, wherein the one or more sensors are operable to obtain thermal readings from the baby and an interior cabin of the vehicle and the controller is further operable to determine whether a deviation between a first temperature of the baby and a second temperature of the interior cabin of the vehicle exceeds a predetermined threshold.

3. The baby comfort monitoring system of claim 2, wherein the controller is further operable to:
    allow the user to adjust the one or more vehicle systems when it is determined the deviation between the first temperature of the baby and the second temperature of the interior cabin of the vehicle exceeds the predetermined threshold.

4. The baby comfort monitoring system of claim 3, wherein the controller is operable to allow the user to engage with the baby using the display.

5. The baby comfort monitoring system of claim 1, wherein the one or more sensors are operable to obtain thermal readings of a vehicle interior cabin and the controller is further operable to determine whether a temperature of the vehicle interior cabin is outside one or more predefined temperature settings.

6. The baby comfort monitoring system of claim 5, wherein the one or more vehicle systems includes an HVAC system and the controller is further operable to adjust the HVAC system when the temperature of the vehicle interior cabin is outside the one or more predefined temperature settings.

7. The baby comfort monitoring system of claim 1, wherein the controller is further operable to:
    determine whether the baby is falling asleep using the information obtained from the one or more sensors.

8. The baby comfort monitoring system of claim 7, wherein the controller is operable to activate the one or more vehicle systems when the baby is falling asleep and a current time is within a baby nap time setting.

9. The baby comfort monitoring system of claim 8, wherein the controller is operable to activate the one or more vehicle systems to tint one or more vehicle windows to darken a vehicle cabin when the baby is falling asleep and the current time is within the baby nap time setting.

10. The baby comfort monitoring system of claim 7, wherein the controller is operable to activate the one or more vehicle systems when the baby is falling asleep and a current time is outside a baby nap time setting.

11. The baby comfort monitoring system of claim 1, wherein the controller is operable to connect with a mobile device to notify the user of the physical state of the baby.

12. A baby comfort monitoring method, comprising:
    obtaining information indicating a physical state of a baby from one or more sensors, the information obtained including a temperature of the baby, a facial characteristic of the baby, and a heart rate of the baby;
    determining the physical state of the baby utilizing the information obtained from the one or more sensors;

activating one or more vehicle systems in response to the physical state of the baby;

activating a vehicle display allowing a user to interact and deter the baby from falling asleep; and outputting on the vehicle display a notification indicative of the physical state of the baby.

13. The method of claim 12 further comprising:

obtaining thermal readings from the baby and an interior cabin of a vehicle; and determining whether a deviation between a first temperature of the baby and a second temperature of the interior cabin of the vehicle exceeds a predetermined threshold.

14. The method of claim 13 further comprising, adjusting the one or more vehicle systems when it is determined that the deviation between the first temperature of the baby and the second temperature of the interior cabin of the vehicle exceeds the predetermined threshold.

15. The method of claim 12 further comprising:

obtaining thermal readings of a vehicle interior cabin; and determining whether a temperature of the vehicle interior cabin is outside one or more predefined temperature settings.

16. The method of claim 12 further comprising determining whether the baby is falling asleep using the information obtained from the one or more sensors.

17. The method of claim 16 further comprising, activating the one or more vehicle systems when the baby is falling asleep and a current time is within a baby nap time setting.

18. The method of claim 16 further comprising, activating the one or more vehicle systems when the baby is falling asleep and a current time is outside a baby nap time setting.

19. A baby comfort monitoring system in a vehicle, comprising:

one or more sensors operable to obtain information indicating a physical state of a baby, the information obtained including a temperature of the baby, a facial characteristic of the baby, and a heart rate of the baby;

a wireless transceiver in communication with a mobile device, wherein the wireless transceiver allows the mobile device to communicate with a camera operable to monitor the baby;

a controller in communication with the one or more sensors and the wireless transceiver, wherein the controller is operable to:

determine the physical state of the baby utilizing the information obtained from the one or more sensors;

activate one or more vehicle systems in response to the physical state of the baby;

activate a vehicle display or a mobile device for a user to interact and deter the baby from falling asleep; and output on the vehicle display or the mobile device a notification indicating the physical state of the baby.

* * * * *